United States Patent Office 3,443,095
Patented May 6, 1969

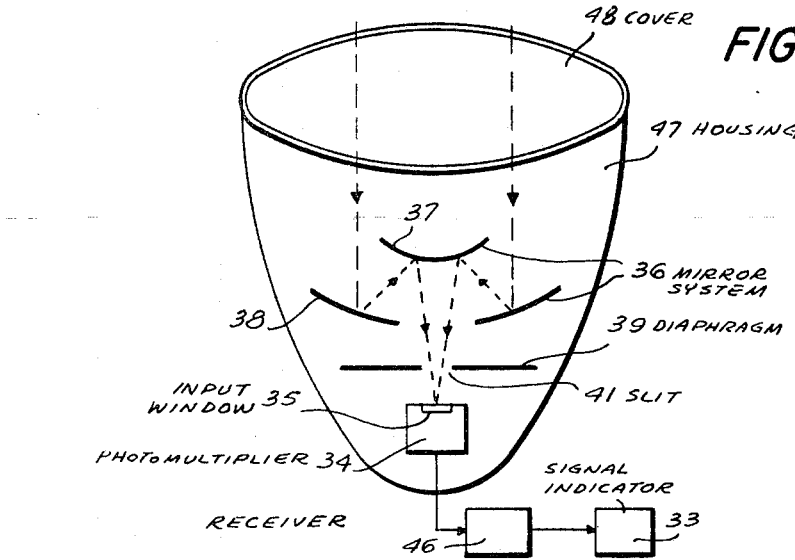
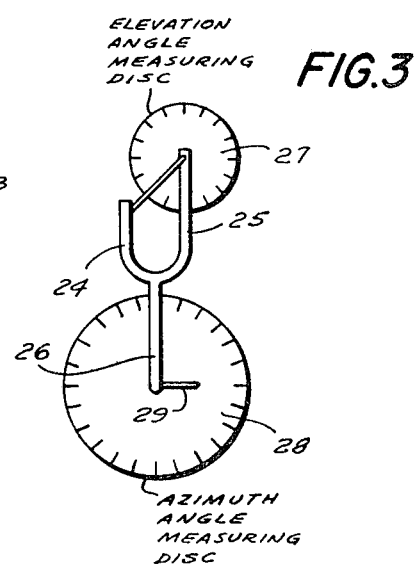
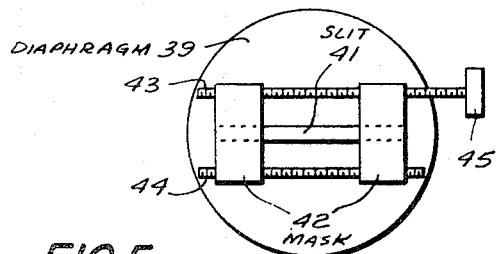
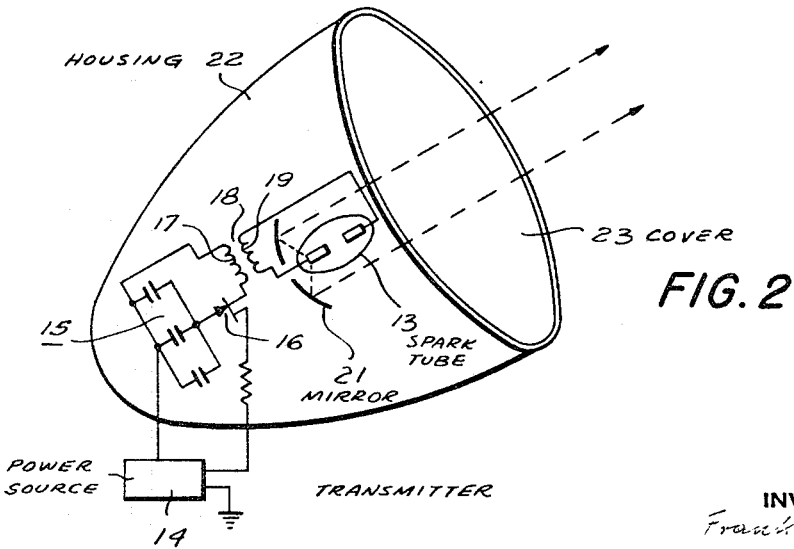

3,443,095
GEODETIC RANGING SYSTEM
Frank Früngel, Herwigredder 105a,
Hamburg-Rissen, Germany
Filed Jan. 4, 1965, Ser. No. 423,079
Int. Cl. G01t 1/16
U.S. Cl. 250—83.3                                12 Claims

ABSTRACT OF THE DISCLOSURE

A geodetic ranging system for locating the direction of a particular geographical point. A transmitter and a receiver adapted to ultraviolet rays, are located at the two points in question. The transmitter transmits a very short ultraviolet wave length signal, within the region of 1,800 to 2,500 angstroms. The peaks of the signals are in the megawatt range and the rise time of the transmitter pulses are of the order of magnitude of nanoseconds. The transmitted signal is designed so that it may be readily distinguished from ordinary white noise and thus make the arrangement useable in both daylight as well as night time applications. The receiver may be directed vertically upward while the transmitter is rotated in both azimuth and elevation so that the transmitter beam intersects the axis of the receiver. The arrangement is particularly applicable to situations wherein the geographical point to be located is inaccessible as a result of natural obstructions in the form of trees and hills.

---

The present invention relates to a geodetic ranging system. More particularly, the invention relates to a geodetic ranging system which is operable day or night regardless of weather conditions.

In geodetics, it is often necessary to locate a given point which is not directly observable due to obstructions such as, for example, trees or hills, between the point and the observer. This difficulty may be overcome at night by directing a beam of light substantially vertically upward from the point and by the observer sighting on such beam of light. This system may not be utilized in the daylight, since the beam of light is not then distinguishable.

The principal object of the present invention is to provide a new and improved geodetic ranging system.

An object of the present invention is to provide a geodetic ranging system which is operable day or night.

An object of the present invention is to provide a geodetic ranging system which is operable regardless of weather conditions.

An object of the present invention is to provide a geodetic ranging system which is operable regardless of obstacles between the given point and the observer.

In order that the present invention may be readily carried into effect, it will now be described with reference to the accompanying drawings, wherein:

FIG. 2 is a schematic diagram of an embodiment of a transmitter of the geodetic ranging system of FIG. 1;

FIG. 3 is a schematic diagram of an embodiment of an azimuth and elevation rotation mounting device for the transmitter of the geodetic ranging system of FIG. 1;

FIG. 4 is a schematic diagram of an embodiment of a receiver of the geodetic ranging system of FIG. 1; and FIG. 5 is a schematic diagram of an embodiment of a diaphragm of a receiver of the embodiment of FIG. 1 having an adjustably variable opening slit.

In the figures, the same components are identified by the same reference numerals.

Figure 1:
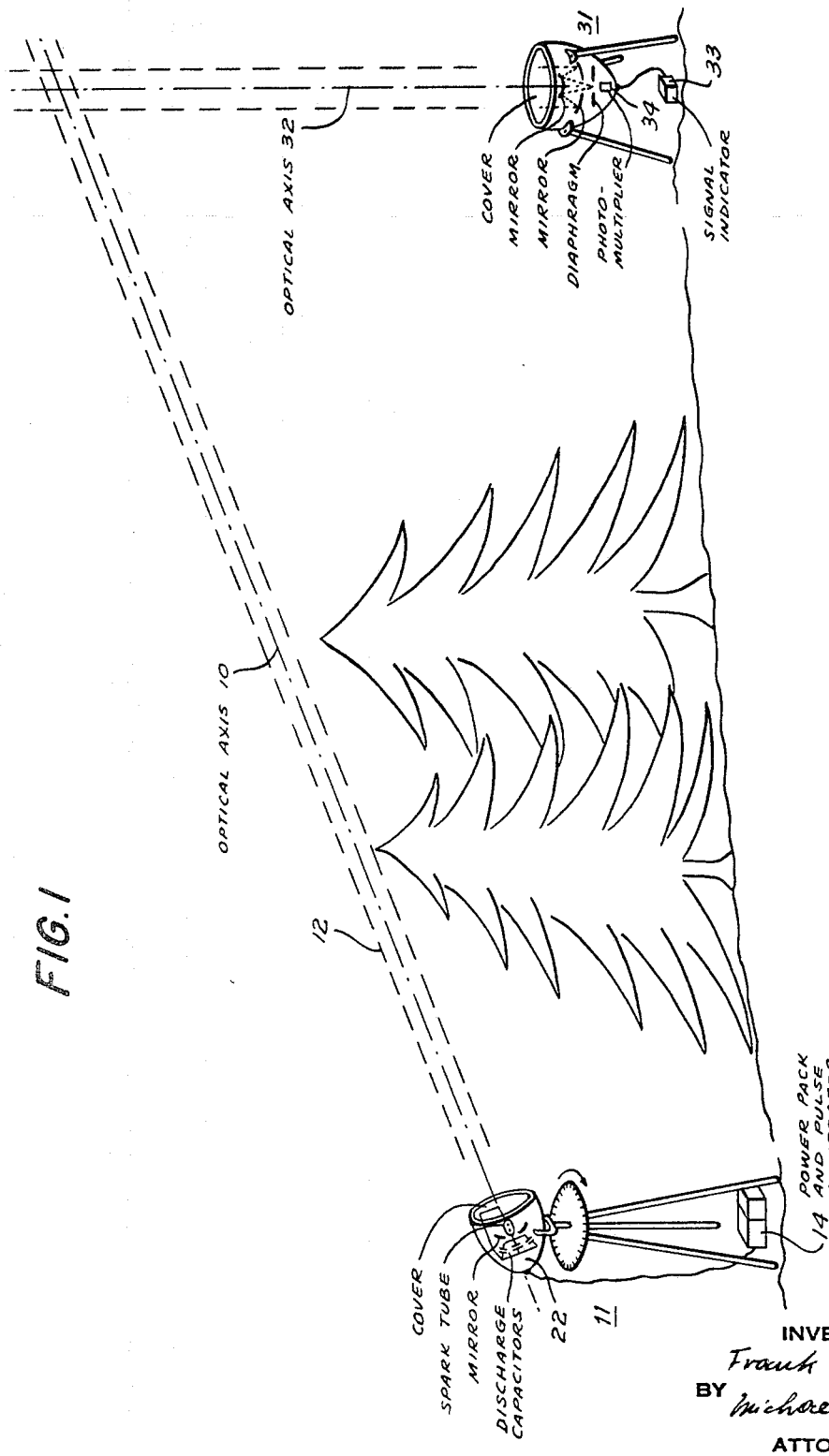
FIG. 1 is a schematic diagram of an embodiment of the geodetic ranging system of the present invention.

In FIG. 1, a transmitter 11 transmits ultraviolet impulses or radiation of very short wavelength in a narrow beam 12. The wavelength of the transmitted ultraviolet radiation is from 1,800 to 2,500 A. and has a peak in the megawatt range. The utilization of ultraviolet radiation of such short wavelength provides the advantages of elimination of interference with the transmitted beam by sunlight and the production of a very high emission of ultraviolet impulses by electric sparks. The rise times of the ultraviolet impulses are in the magnitude of nanoseconds. The impulses transmitted may be at the rate of 50 pulses per second at 10 megawatts. The transmitter 11 has an optical axis 10 extending centrally through the beam 12 of ultraviolet radiation transmitted by said transmitter.

As shown in FIG. 2, the transmitter 11 comprises a pressurized spark gap discharge tube 13 for providing spark discharges of very short wavelength having rise times in the magnitude of nanoseconds. The spark gap discharge tube 13 has an envelope of any suitable material such as, for example, quartz. The spark gap discharge tube 13 contains a gas under high pressure. The spark gap discharge tube 13 preferably contains nitrogen or carbon dioxide and a small amount of a rare gas such as argon, krypton or xenon. The sparks produced by the spark gap discharge tube 13 are of very high peak radiation intensity and are suitable for the creation of nearly parallel waves to form a narrow beam which is suitable for geodetic ranging. The gases in the spark discharge tube 13 may be under very high pressure.

The transmitter 11 (FIG. 2) comprises an electrical power source 14 which may comprise, for example, a portable battery-operated power pack and pulse generator of any suitable known type. A plurality of capacitors 15 are connected to the power source 14 and are charged by said power source. The capacitors 15 are connected in parallel with each other. An electronic switch 16 such as, for example, a silicon controlled rectifier or SCR has a control or ignition electrode connected to the pulse generator of the power source 14 and has an anode and a cathode. The capacitors 15 are coupled to the spark discharge tube 13 through the anode-cathode path of the SCR 16. The anode of the SCR 16 is connected to the capacitors 15 and the cathode of said SCR is connected to the primary winding 17 of a transformer 18. The secondary winding 19 of the transformer 18 is connected at one end to one end of the spark discharge tube 13 and at the other end to the other end of said spark discharge tube.

The capacitor discharge circuit 15, 16, 17, 18, 19, 13 has a very low inductance which is preferably lower than 5 nanohenries. The capacitors 15 are charged by the power source 14 and while said capacitors are being charged, the SCR 16 is in its non-conductive condition in which it prevents the discharge of said capacitors. When the capacitors 15 are charged, the pulse generator of the power source 14 supplies sufficient current to the control or ignition electrode of the SCR 16 to switch said SCR to its conductive condition. The switching of the SCR 16 to its conductive condition closes the circuit through the primary winding 17 of the transformer 18 and permits the discharge of the capacitors 15. The discharge voltage of the capacitors 15, amplified by the transformer 19, energizes the spark discharge tube 13 to produce ultraviolet impulses.

A mirror 21 is positioned in proximity with the spark discharge tube 13 for forming the ultraviolet impulses or radiation provided by said spark discharge tube into a narrow beam. The mirror is preferably of paraboloidal configuration and preferably comprises aluminum or a surface of aluminum. The transmitter apparatus is preferably mounted in a substantially paraboloidal housing 22 of any suitable material. The opening of the housing 22 is preferably covered by a cover 23 of suitable material such as, for example, Suprasil.

The transmitter housing 22 is mounted for rotation in a substantially horizontal plane to determine azimuth and for rotation in a substantially vertical plane to determine elevation by any suitable angle measuring means such as, for example, the rotation mounting device of FIG. 3. The housing 22 of the transmitter may be pivotally mounted between the spaced arms 24 and 25, which arms extend from a stem 26 which is rotatably mounted for rotation in a horizontal plane. An elevation angle measuring disc 27 may be affixed to the side of the housing 22 so that, in relation to the position of one of the arms 24 and 25 or an indicator affixed to one of said arms, an elevation measurement may be made. An azimuth measuring disc 28 may be positioned coaxially around the stem 26 in a substantially horizontal plane so that, in relation to the position of said stem or an indicator 29 affixed thereto, an azimuth measurement may be made.

In FIG. 1, a receiver 31 receives and indicates the ultraviolet radiation or impulses transmitted by the transmitter 11. The receiver 31 has an optical axis 32 and when said optical axis intersects the beam 12 of ultraviolet radiation transmitted by the transmitter 11, said receiver indicates that such has occurred. The indication that the optical axis 32 of the receiver 31 has intersected the beam 12 of ultraviolet radiation is provided by any suitable means such as, for example, a signal indicator or wireless transmitter 33.

As shown in FIG. 4, the receiver 31 comprises a photomultiplier 34 of any suitable known type such as, for example, described on page 2–117 of "Industrial Electronics Handbook," William D. Cockrell, Editor in Chief, 1958, McGraw-Hill Book Company, Inc., First Edition. The photomultiplier 34 is sensitive to ultraviolet radiation and is almost completely insensitive to daylight. The photomultiplier 34 comprises a cathode of rubidium-telluride, a plurality of multiplier stages for multipliyng radiation received by the cathode and an input window 35 of suitable material such as, for example, sapphire, quartz or lithium-fluoride. The rubidium-telluride cathode of the photomultiplier 34 is especially suitable because it is sensitive to ultraviolet radiation of short wavelength of 2,500 A. or less and is completely insensitive to ultraviolet radiation having a wavelength greater than 2,900 A. as included in daylight. The photomultiplier 34 has a very high radiation amplification factor.

The receiver 31 (FIG. 4) comprises a mirror system 36 for directing or focussing radiation received by said receiver onto the cathode of the photomultiplier 34. The mirror system 36 may comprise, for example, a paraboloidal mirror 37 opening toward the source of received radiation and a hyperboloidal mirror 38 between the paraboloidal mirror 37 and the photomultiplier 34 and opening toward the source of ultraviolet radiation. Each of the mirrors 37 and 38 preferably comprises aluminum or a surface of aluminum.

A diaphragm 39 (FIG. 5) having an adjustably variable opening slit 41 is positioned in proximity with the photomultiplier 34 between said photomultiplier and the convex back surface of the hyperboloidal mirror 38. The opening of the slit 41 is adjustably variable by any suitable means such as, for example, a pair of spaced masks 42 mounted on threaded or guide members or bars 43 and 44 in a manner whereby when a handle 45 affixed to the guide bar 43 is turned in one of a clockwise and counterclockwise direction said masks are moved toward each other to make the slit opening smaller and when said handle is turned in the other of the clockwise and counterclockwise direction the said masks are moved away from each other to make the slit opening larger.

The ultraviolet radiation impinging upon the cathode of the photomultiplier 34 is amplified in said photomultiplier and is supplied to the signal indicator 33 via an amplifier and/or filter circuit 46. The signal indicator 33 may comprise, for example, a monostable multivibrator which is connected to energize a radio or telephone transmitter. Any suitable known monostable multivibrator arrangement and any suitable known radio, wireless, telephone or wire transmitter may be utilized in the signal indicator 33. The amplification factor of the photomultiplier 34 may be so high that the amplifier 46 may be dispensed with.

The signals transmitted by the signal indicator 33 of the reciver 31 may be received by a suitable radio, wireless, telephone or wire receiver at the site of the transmitter 11 to enable the observer to determine when the optical axes 10 and 32 of the transmitter 11 and the receiver 31, respectively, intersect. This enables facile and rapid coordination of the azimuth angle at the proper point, which point is that at which the optical axes 10 and 32 intersect. The radio or telephone receiver at the site of the transmitter 11 is not shown in the drawings.

The receiver apparatus is prefably mounted in a substantially paraboloidal housing 47 of any suitable material. The opening of the housing 47 is preferably covered by a cover 48 of a suitable material such as, for example, Suprasil. The housings 22 and 47 and the covers 23 and 48 are essentially the same.

The receiver 31 is preferably directed with its optical axis 32 extending substantially vertically upward. The transmitter 11 is then varied in its azimuth angle to sweep the horizon with the beam 12 of ultraviolet radiation. When the optical axis 10 of the transmitter 11, which is also the axis of the transmitted beam 12 of ultraviolet radiation, intersects with the optical axis 32 of the receiver 31, the signal indicator 33 of said receiver indicates that the proper point has been reached by transmitting a signal to the wire or wireless receiver (not shown) at the transmitter site. The azimuth angle measurement at that point is the proper angle, and the receiving of the signal from the signal indicator 33 of the receiver 31 at the transmitter site enables the observer to be so advised.

The pulse repetition rate or frequency of the ultraviolet impulses produced and transmitted by the transmitter 11 may be in the range of 50 to 100 pulses per second. However, the ultraviolet impulses may be transmitted at a pulse repetition rate of 5 pulses per second. The lower pulse frequency makes ranging with the geodetic ranging system of the present invention more difficult since the optical axis 32 of the receiver 31 may be bypassed by the beam 12 of ultraviolet radiation during horizon scanning or ranging by the transmitter 11. In such a case, the initial ranging is undertaken with the slit 41 of the diaphragm 39 of the receiver 31 adjusted to a wide or large opening for broad ranging and to a narrower or smaller opening of said slit for fine ranging. The opening of the slit 41 (FIG. 5) may be adjusted either continuously or stepwise.

The frequency of the ultraviolet impulses transmitted by the transmitter 11 may be varied in accordance with the change from broad ranging to fine ranging at the receiver 31. This may be accomplished by any suitable means (not shown in the drawings).

A single transmitter may be utilized with a plurality of receivers in the geodetic ranging system of the present invention. In such a case, the signal indicator at each of the receivers would produce a signal having an identifying characteristic to enable the observer to identify it. Such an identifying characteristic may be, for example, a frequency assigned to the corresponding receiver and different from the frequencies of the other receivers.

While the invention has been described by means of specific examples and in a specific embodiment, I do not wish to be limited thereto, for obvious modifications will occur to those skilled in the art without departing from the spirit and scope of the invention.

What I claim is:

1. A geodetic direction-finding system comprising a transmitter unit transmitting a substantially parallel beam of radiation and a receiver unit sensitive to said radiation, said units being located at two spaced points the direction of one of which from the other is to be determined, means for adjusting the optical axis of one of said units so that it extends upwardly in vertical direction, means for adjusting the optical axis of the other of said units so that it has an adjusted upward inclination; and means for rotating the other of said units about a vertical axis until the reception by the receiver unit of atmospherically scattered radiation from said substantially parallel beam of radiation transmitted by said transmitter unit indicates that the optical axis of the receiver unit is directed at a part of said substantially parallel beam of radiation, the thus obtained position of said other unit being an indication of the direction between said two points.

2. The geodetic direction-finding system as defined in claim 1 wherein said beam of radiation is a beam of ultra-violet impulses.

3. The geodetic direction-finding system as defined in claim 2 wherein said ultra-violet impulses are of substantially short wavelength having rise times of the magnitude of nanoseconds.

4. The geodetic direction-finding system as defined in claim 2 wherein said ultra-violet impulses are spark discharges of substantially short wavelength having rise times of the magnitude of nanoseconds.

5. The geodetic direction-finding system as defined in claim 4 including a high-pressure source for producing said spark discharges.

6. The geodetic direction-finding system as defined in claim 4 including a pressurized spark gap discharge tube for producing said spark discharges, said spark gap discharge tube containing one of the group of gases consisting of nitrogen, carbon dioxide and a relatively small amount of rare gas.

7. The geodetic direction-finding system as defined in claim 1 wherein said transmitter unit includes an electrical power source; amplifying means connected to said power source for amplifying electrical energy from said power source; a source of spark discharges of substantially short wavelength connected to said amplifying means for providing ultra-violet impulses substantially of short wavelength; and forming means positioned in proximity with said source of spark discharges for forming the ultra-violet impulses provided by said source of spark discharges into a substantially narrow beam.

8. The geodetic direction-finding system as defined in claim 1 wherein said transmitter unit includes an electrical power source; capacitor means connected to said power source for charging by said power source; switching means; and a source of spark discharges of substantially short wavelength coupled to said capacitor means through said switching means for providing when energized by discharge of said capacitor means upon discharge of said capacitor means ultra-violet impulses substantially of short wavelength.

9. The geodetic direction-finding system as defined in claim 1 wherein said transmitter unit includes an electrical power source; capacitor means connected to said power source for charging by said power source; silicon controlled rectifier means; and a source of spark discharges of substantially short wavelength coupled to said capacitor means through said silicon controlled rectifier means for providing when energized by discharge of said capacitor means upon discharge of said capacitor means ultra-violet impulses of substantially short wavelength.

10. The geodetic direction-finding system as defined in claim 2 wherein said receiver unit includes photomultiplier means sensitive to ultra-violet radiation and substantially insensitive to daylight; and radiation directing means for focusing radiation onto said photomultiplier means.

11. The geodetic direction-finding system as defined in claim 10 wherein said radiation directing means comprises a diaphragm having a slit formed therethrough positioned in proximity with said photomultiplier means and mirror means for directing radiation received by said receiver means onto said photomultiplier means through the slit of said diaphragm.

12. The geodetic direction-finding system as defined in claim 10 wherein said photomultiplier means comprises a cathode of rubidium-tellurite for receiving radiations and multiplier stages for multiplying the radiations received by said cathode, said photomultiplier means having a substantially high amplification factor.

References Cited

UNITED STATES PATENTS

| | | | |
|---|---|---|---|
| 2,237,193 | 4/1941 | Mobsby | 250—83.3 |
| 2,490,011 | 12/1949 | Bird | 250—83.3 |
| 2,682,798 | 7/1954 | Schock | 88—1 |
| 3,011,058 | 11/1961 | Becker | 250—83.3 |
| 3,129,332 | 4/1964 | Leen | 250—83.3 |

RALPH G. NILSON, *Primary Examiner.*

A. B. CROFT, *Assistant Examiner.*

U.S. Cl. X.R.

88—14